United States Patent
Chen et al.

(10) Patent No.: US 10,783,765 B2
(45) Date of Patent: Sep. 22, 2020

(54) FALLING DETECTION METHOD AND ELECTRONIC SYSTEM USING THE SAME

(71) Applicant: Wistron Corporation, New Taipei (TW)

(72) Inventors: Yu-Yen Chen, New Taipei (TW); Yi-Sheng Chao, New Taipei (TW)

(73) Assignee: Wistron Corporation, New Taipei (TW)

( * ) Notice: Subject to any disclaimer, the term of this patent is extended or adjusted under 35 U.S.C. 154(b) by 186 days.

(21) Appl. No.: 16/205,238

(22) Filed: Nov. 30, 2018

(65) Prior Publication Data

US 2020/0090484 A1    Mar. 19, 2020

(30) Foreign Application Priority Data

Sep. 13, 2018   (TW) .............................. 107132301 A

(51) Int. Cl.
*G06K 9/00* (2006.01)
*G08B 21/04* (2006.01)
(Continued)

(52) U.S. Cl.
CPC ....... *G08B 21/043* (2013.01); *G06K 9/00342* (2013.01); *G06K 9/00369* (2013.01);
(Continued)

(58) Field of Classification Search
CPC .... F04B 49/065; F04D 15/00; F04D 15/0088; G06F 21/35; G06F 2221/2111; H04L 63/107; H04L 67/12; H04W 12/06; H04W 4/021; H04W 4/023; G06K 9/00342; G06K 9/00369; G06K 9/00711; G06K 9/6257; G06K 9/6267; G06T 2207/10016; G06T 2207/30196; G06T 7/246; G06T 7/50; G06T 7/73; G08B 13/19608; G08B 21/043; G08B 25/08
See application file for complete search history.

(56) References Cited

U.S. PATENT DOCUMENTS 9,202,283 B2    12/2015  Ramzi

FOREIGN PATENT DOCUMENTS

CN    102722721    10/2012
CN    103996051     8/2014
(Continued)

OTHER PUBLICATIONS

Wen-Yao Tsai, "Falling Down Detection at Night by Thermal Imager", Department of Computer Science & Information Engineering, National Central University, Jun. 2012, pp. 1-69.

*Primary Examiner* — Xin Jia
(74) *Attorney, Agent, or Firm* — JCIPRNET

(57) ABSTRACT

A falling detection method and an electronic system using the same are provided. The falling detection method includes: obtaining a video stream, and performing recognition on a person in an image of the video stream to obtain at least one human body feature; calculating based on the human body feature to obtain at least one falling related feature; calculating at least one movement trend in a plurality of directions of the person in the video stream by using an optical flow algorithm; inputting the falling related feature and the movement trend to a falling classifier, such that the falling classifier generates an output result indicating whether a falling event happens to the person; and sending an alarm according to the output result.

18 Claims, 6 Drawing Sheets

(51) Int. Cl.
    *G06K 9/62*         (2006.01)
    *G06T 7/246*       (2017.01)
    *G06T 7/50*         (2017.01)
    *G06T 7/73*         (2017.01)

(52) U.S. Cl.
    CPC ........ *G06K 9/00711* (2013.01); *G06K 9/6257* (2013.01); *G06K 9/6267* (2013.01); *G06T 7/246* (2017.01); *G06T 7/50* (2017.01); *G06T 7/73* (2017.01); *G06T 2207/10016* (2013.01); *G06T 2207/30196* (2013.01)

(56) References Cited

FOREIGN PATENT DOCUMENTS

| | | |
|---|---|---|
| CN | 105719429 | 6/2016 |
| CN | 105868711 | 8/2016 |
| CN | 106571014 | 4/2017 |
| CN | 106909887 | 6/2017 |
| CN | 107220604 | 9/2017 |
| CN | 107657244 | 2/2018 |
| TW | I335181 | 12/2010 |
| TW | 201145183 | 12/2011 |
| TW | I391881 | 4/2013 |
| TW | I474291 | 2/2015 |
| TW | I493510 | 7/2015 |
| TW | I541769 | 7/2016 |
| TW | M537281 | 2/2017 |
| TW | 201810187 | 3/2018 |

FALLING DETECTION METHOD AND ELECTRONIC SYSTEM USING THE SAME

CROSS-REFERENCE TO RELATED APPLICATION

This application claims the priority benefit of Taiwan application serial no. 107132301, filed on Sep. 13, 2018. The entirety of the above-mentioned patent application is hereby incorporated by reference herein and made a part of this specification.

BACKGROUND OF THE INVENTION

Field of the Invention

The invention relates to a detection method and an electronic system using the same, and particularly relates to a detection method adapted to detect whether a falling event happens to a person in a specific field and an electronic system using the same.

Description of Related Art

Falls often cause serious injuries to the old people, and the common injuries include brain injury, hip bone fracture, vertebral fracture, pelvic fracture, etc. Most of the old people have no one else to help them after they fall down, so that the falling old people cannot get immediate help, which may cause more serious damage or even death. In order to detect the fall of the old people in time, and send an urgent message to family members or medical staff, falling detection systems have become one of the key projects of medical care in recent years.

The commonly used falling detection system adopts a wearable device in collaboration with a three-axis accelerometer. A principle of such type of falling detection system is to collect a value variation of the three-axis accelerometer, and determine occurrence of a falling event through value analysis by defining a threshold of a falling acceleration. However, such system must require the user to wear the wearable device at all times, and accuracy of the falling detection is varied along with different positions of the wearable device. Besides the problem of accuracy, a detection time of the system is also limited by battery capacity. Therefore, the current falling detection system is not convenient in usage.

SUMMARY OF THE INVENTION

The invention is directed to a falling detection method and an electronic system using the same, which have high convenience, and are adapted to maintain high accuracy with reduced cost.

An embodiment of the invention provides a falling detection method includes: obtaining a video stream, and performing recognition on a person in an image of the video stream to obtain at least one human body feature; calculating based on the human body feature to obtain at least one falling related feature; calculating at least one movement trend of the person in a plurality of directions in the video stream by using an optical flow algorithm; inputting the falling related feature and the movement trend to a falling classifier, such that the falling classifier generates an output result indicating whether a falling event happens to the person; and sending an alarm according to the output result.

An embodiment of the invention provides an electronic system including an image capturing device, a processor and a warning device. The image capturing device is configured to obtain a video stream. The processor is coupled to the image capturing device, and is configured to: perform recognition on a person in an image of the video stream to obtain at least one human body feature; calculate based on the human body feature to obtain at least one falling related feature; calculate at least one movement trend of the person in a plurality of directions in the video stream by using an optical flow algorithm; input the falling related feature and the movement trend to a falling classifier, such that the falling classifier generates an output result indicating whether a falling event happens to the person. The warning device is coupled to the processor, and sends an alarm according to the output result.

An embodiment of the invention provides an electronic system including an image capturing device, an object tracking module, an optical flow determination module and a falling classifier. The image capturing device is configured to obtain a video stream. The object tracking module is configured to perform recognition on a person in an image of the video stream to obtain at least one human body feature, and calculate based on the human body feature to obtain at least one falling related feature. The optical flow determination module is configured to calculate at least one movement trend of the person in a plurality of directions in the video stream. The falling classifier receives the falling related feature and the movement trend, and outputs an output result indicating whether a falling event happens to the person.

Based on the above description, the falling detection method and the electronic system provided by the embodiment of the invention are adapted to use an image analysis method to determine whether a falling event happens to a person in the video stream, which has high convenience, and has a low cost. Particularly, by using a machine learning method, a plurality of falling related features and statistic information of optical flow vectors in the video stream are taken as the input of the falling classifier, so as to improve determination accuracy.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
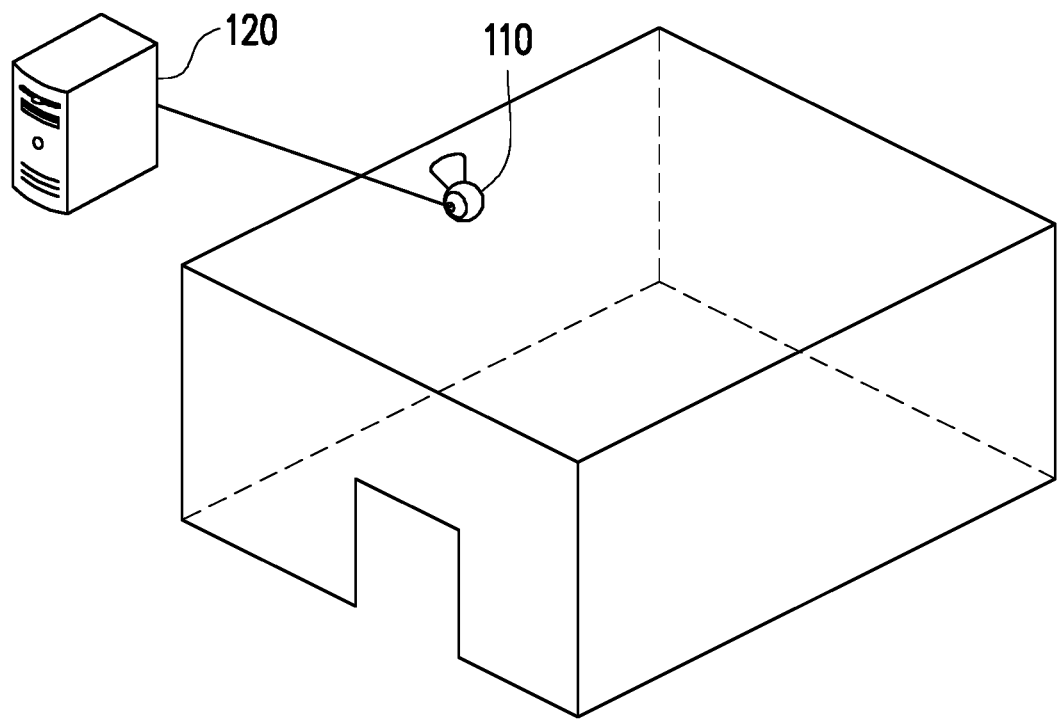
FIG. 1 is a schematic diagram of a falling detection method according to an embodiment of the invention.

FIG. 1 is a schematic diagram of a falling detection method according to an embodiment of the invention.

Referring to FIG. 1, in some embodiments, at least one image capturing device 110 is mounted indoors, and an external host 120 obtains a video stream captured by the image capturing device 110 and performs analysis on the video stream to determine whether someone falls in the room according to the video stream. In this way, the falling detection is not limited by a wearable device, and anyone falling in this room may be detected. In some embodiments, the external host 120 is, for example, a server, a personal computer, a notebook computer, a tablet computer, a smart phone or a similar device, which is not limited by the invention.

Figure 2:
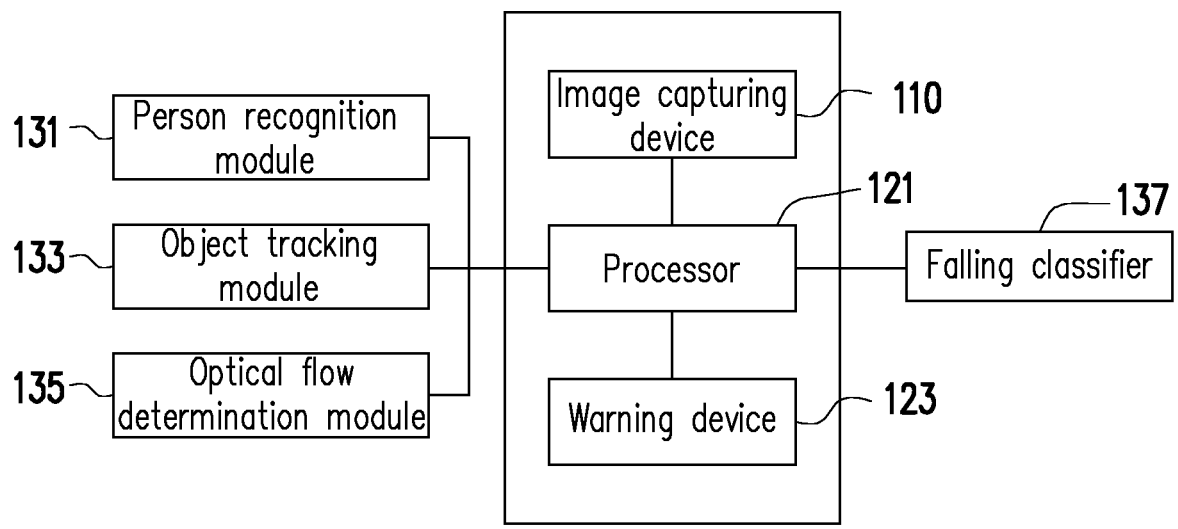
FIG. 2 is a block diagram of an electronic system according to an embodiment of the invention.

FIG. 2 is a block diagram of an electronic system according to an embodiment of the invention.

Referring to FIG. 2, the electronic system 100 includes an image capturing device 110, a processor 121 and a warning device 123, where the image capturing device 110 and the warning device 123 are all electrically coupled to the processor 121. In an embodiment of the invention, the image capturing device 110, the processor 121 and the warning device 123 in the electronic system 100 may be implements as a whole, for example, implemented as a notebook computer, etc. In another embodiment of the invention (for example, the embodiment of FIG. 1), the electronic system 100 may include two independent devices of the image capturing device 110 and the external host 120, and the external host 120 includes the processor 121 and the warning device 123. In other embodiments of the invention, the image capturing device 110, the processor 121 and the warning device 123 in the electronic system 100 may be, for example, respectively implemented by three independent devices. However, the invention is not limited thereto.

The image capturing device 110 is configured to obtain a video stream including a plurality of images. In some embodiments, the image capturing device 110 is, for example, an infrared camera, a black-white camera or a color camera, etc., which is not limited by the invention. The image capturing device 110 may be a 2D image camera, or may be a 3D image camera adapted to produce depth information, which is not limited by the invention.

The processor 121 is configured to obtain the video stream from the image capturing device 110, and recognize whether a person exists through a person recognition module 131, and then data generated through respective detection of an object tracking module 133 and an optical flow determination module 135 are sent to a falling classifier 137 to determine whether someone has fallen. In some embodiments, the processor 121 is, for example, a dual-core, quad-core or eight-core Central Processing Unit (CPU) of various types, a System-On-Chip (SOC), an application processor, a media processor, a microprocessor, a digital signal processor or other similar, and the type of the processor is not limited by the invention. Moreover, the aforementioned person recognition module 131, the object tracking module 133, the optical flow determination module 135 and the falling classifier 137 are, for example, computer program codes, which may be loaded and executed by the processor 121. In some embodiments, the aforementioned person recognition module 131, the object tracking module 133, the optical flow determination module 135 and the falling classifier 137 are, for example, stored in a storage device (not shown) of the external host 120. In some other embodiments, one of or a plurality of the aforementioned person recognition module 131, the object tracking module 133, the optical flow determination module 135 and the falling classifier 137 may be selectively configured in a remote cloud device outside the external host 120 according to requirements of actual hardware performance, construction cost and a layout design, for example, the falling classifier 137 with a machine learning function may be disposed on the remote cloud device.

The warning device 123 is used for sending an alarm according to an instruction of the processor 121. In some embodiments, the warning device 123 is, for example, a loudspeaker, a display, a vibrator, a lamp or any other device that may be perceived by people. For example, the loudspeaker may send a prompt message in sound to remind the user; the display may send a prompt message in figures or characters to remind the user; the vibrator may send a prompt message in shockwaves or a pressure to remind the user; the light may send a prompt message in a specific color or a specific flicking frequency to remind the user. Those skilled in the art may design or modify the warning device 123 according to an actual requirement, so as to implement the warning device 123 adapted to send an alarm to remind the user, and detailed implementation of the warning device 123 is not limited by the invention, and it is also not limited to send the instruction to the warning device 123 to send the alarm in a wired, wireless or network manner.

Figure 3:
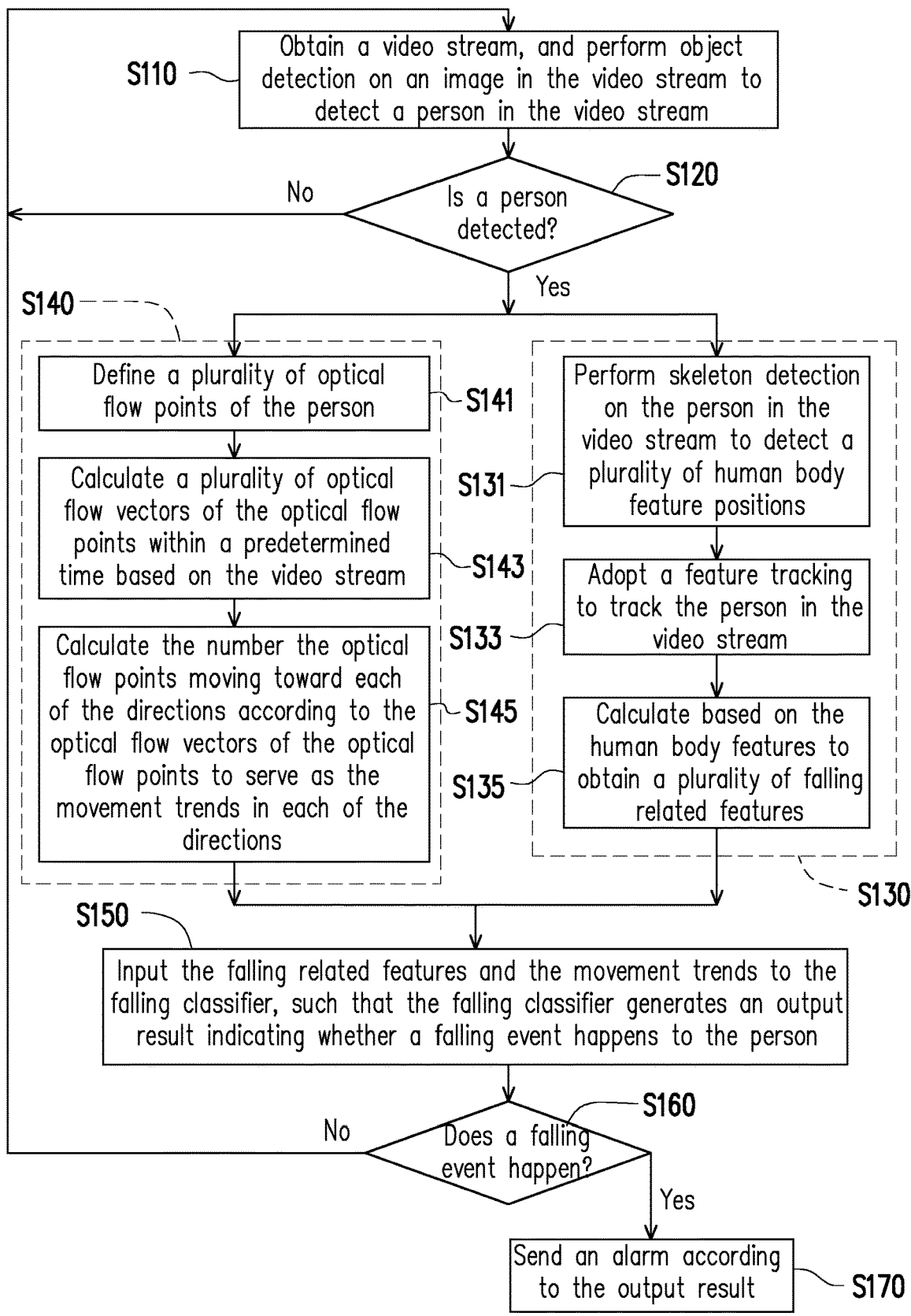
FIG. 3 is a flowchart illustrating a falling detection method according to an embodiment of the invention.

FIG. 3 is a flowchart illustrating a falling detection method according to an embodiment of the invention.

The embodiment of FIG. 3 is adapted to the electronic system 100 of the embodiment of FIG. 2, so that the falling detection method is described below with reference of the electronic system 100. It should be noted that the falling detection method of the embodiment is not limited to be implemented by using the electronic system 100.

Referring to FIG. 3, in step S110, the processor 121 obtains a video stream through the image capturing device 110, and uses the person recognition module 131 to perform object detection on an image in the video stream, so as to detect a person in the video stream. In step S120, the processor 121 determines whether the person in the image is detected according to a detection result of the person recognition module 131. To be specific, the person recognition module 131 may adopt a known character detection algorithm (such as R-CNN, Fast R-CNN, Faster R-CNN, Mask R-CNN, YOLO, etc.) to detect the person in the image.

Figure 4:
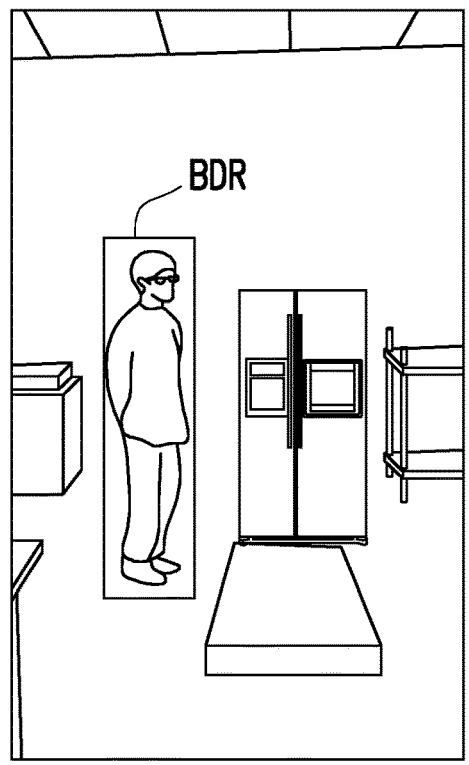
FIG. 4 is a schematic diagram of object detection according to an embodiment of the invention.

In an embodiment of the invention, as shown in FIG. 4, besides that the person recognition module 131 recognizes the person in the image IMG, the person recognition module 131 further defines some human body features according to the recognition result, for example, a rectangular bounding box BDR. However, the invention is not limited thereto.

If the processor 121 does not detect a person in the image, the flow returns to the step S110 to continually monitor whether the video stream has a person therein. Conversely, if the processor 121 detects the person in the image, steps S130, S140 are executed.

In the step S130, the object tracking module 133 obtains a plurality of falling related features according to the detection result of the person recognition module 131 for further determination of whether a falling event happens. In detail, the falling related features are variables that may be analyzed from the image, and when the person falls, these variables may have a specific property. In other words, the falling related features are human body features related to a falling motion, which may assist to determine whether the person in the image falls.

Figure 5:
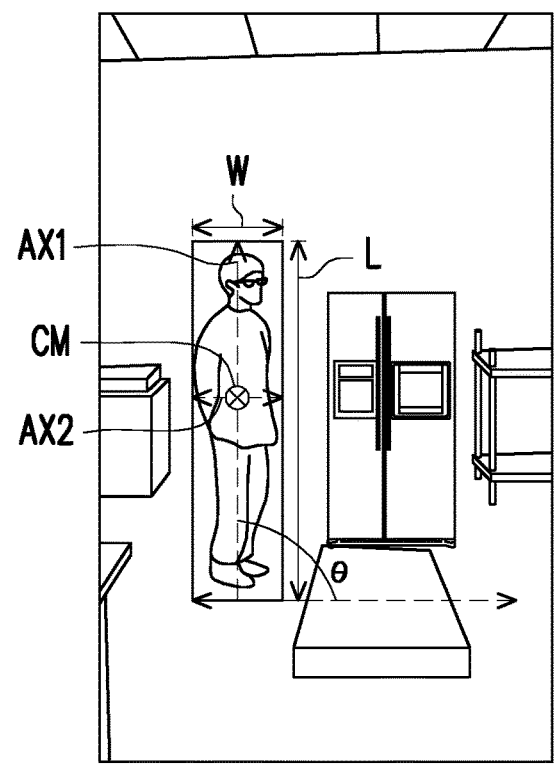
FIG. 5 is a schematic diagram of object detection according to an embodiment of the invention.

In an embodiment of the invention, the falling related features may be obtained through calculation of the human body features obtained by the person recognition module 131. As shown in FIG. 5, the falling related feature, for example, includes one of a length-width ratio L/W of the bounding box BDR of the person, a main axis AX1 and a short axis AX2, a human body azimuth θ, a height of a center of mass CM, a speed of the center of mass CM and a vertical axis displacement of the center of mass CM, or a combination thereof. The center of mass CM may be, for example, a center point of the bounding box BDR, and the speed of the center of mass CM and the vertical axis displacement of the center of mass CM are, for example, calculated according to three continuous images (for example, a currently processed image and two previous images in the video stream), which is not limited by the invention.

For example, when the person falls, phenomena such as the length-width ratio L/W is probably reduced, the main axis AX1 is reduced and the short axis AX2 is expanded, the human body azimuth θ is reduced, the height of the center of mass CM is decreased, the speed of the center of mass CM is greater than a specific speed threshold, the vertical axis displacement of the center of mass CM is greater than a displacement threshold, etc., are probably occurred, and these falling related features are related to the falling motion, which may assist to determine whether the person in the image falls.

In another embodiment of the invention, the step S130 further includes steps S131 to S135.

In the step S131, the object tracking module 133 performs skeleton detection on the person in the video stream to detect a plurality of human body feature positions. To be specific, the object tracking module 133 adopts a skeleton detection algorithm (for example, OpenPose, DeepPose, etc.) to detect positions of a plurality of human body features (for example, at least one of eyes, a nose, ears, a neck, a shoulder, elbows, wrists, a hip portion, knees and ankles) of the person.

Figure 6:
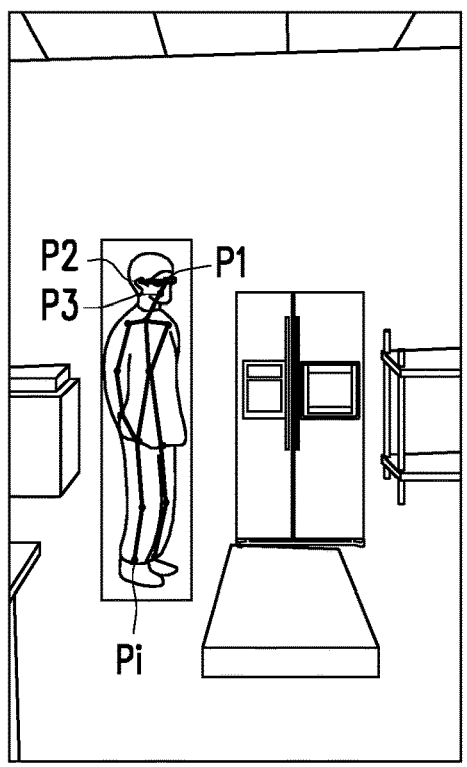
FIG. 6 is a schematic diagram of skeleton detection according to an embodiment of the invention.

In an embodiment, as shown in FIG. 6, the object tracking module 133 may use the skeleton detection algorithm to find a plurality of human body features P1, P2, P3, . . . , Pi of the person in the bounding box BDR, and the human body features are, for example, located at the eyes, the nose, the ears, the neck, the shoulder, the elbows, the wrists, the hip portion, the knees, the ankles, etc., of the person, which are not limited by the invention.

In step S133, the object tracking module 133 adopts a feature tracking to track the person in the video stream. To be specific, the object tracking module 133 may adopt a feature tracking algorithm (for example, a Kalman filter, etc.) to track the person that is already detected in the image IMG. In this way, even if positions of the person are changed in subsequent images of the video stream, the object tracking module 133 is unnecessary to repeat object detection and other computations with a heavy computational burden.

In step S135, the object tracking module 133 may calculate based on the human body features to obtain a plurality of falling related features. Besides that the falling related features may be calculated based on the human body features obtained by the person recognition module 131 as that described above, the object tracking module 133 may alternatively or further calculate other falling related features by using the human body features obtained based on the skeleton detection, for example, to determine distances respectively between the eyes, the nose, the ears, the neck, the shoulder and the ground, etc. Namely, when the person falls, the distance respectively between the eyes, the nose, the ears, the neck, the shoulder and the ground are probably reduced, so that these falling related features are also related to the falling motion, which may also assist to determine whether the person in the image falls.

In step S140, the optical flow determination module 135 calculates a plurality of movement trends of the person in a plurality of directions in the video stream by using an optical flow algorithm. To be specific, the body of the person includes a plurality of parts, and each of the body parts may move toward different directions. Therefore, the movement trends of the person in a plurality of directions are, for example, to calculate the numbers of the body parts moving toward each of the direction. For example, when the body of the person has more parts to move downward and move to the right, it is regarded that the movement trends of the person moving downward and to the right are larger, and the movement trends of the person moving upward and to the left are smaller. For example, when the person falls, the body parts moving downward are probably relatively more, so that the movement trends of the person in multiple directions may also assist to determine whether the person in the image falls.

In an embodiment, the step S140 further includes steps S141 to S145.

In the step S141, the optical flow determination module 135 defines a plurality of optical flow points of the person. Thereafter, in the step S143, the optical flow determination module 135 calculates a plurality of optical flow vectors of the optical flow points within a predetermined time based on the video stream. For example, the optical flow determination module 135, for example, adopts a Lucas-Kanade optical flow algorithm of OpenCV to first find the optical flow points (for example, boundary points or corner points, etc.) in the image, and then calculates a displacement vector of each of the optical flow points according to position variations of the optical flow points in a plurality of images of the video stream within the predetermined time, and the displacement vectors located at different positions in the image represent the optical flow. Those with ordinary skills in the art may obtain enough algorithms for calculating the optical flow information and finding the feature points (for example, a Canny edge detection algorithm, a Harris corner detection algorithm, etc.) from related literatures, which is not limited by the invention.

Figure 7:
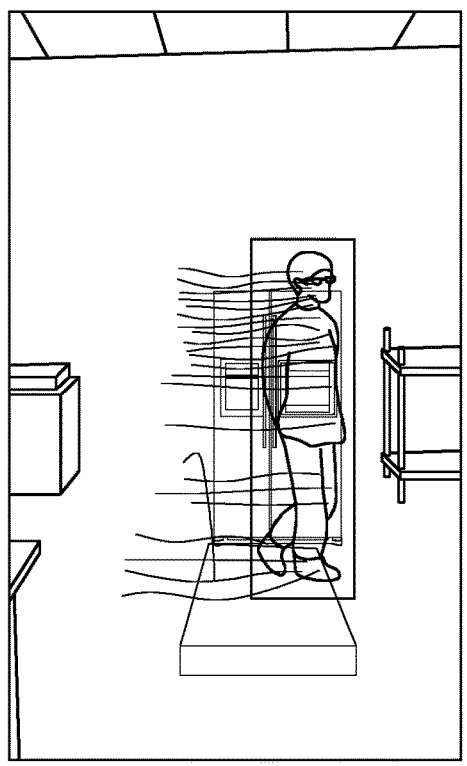
FIG. 7 is a schematic diagram of an optical flow trajectory according to an embodiment of the invention.

In an embodiment of the invention, the optical flow determination module 135 may define a plurality of optical flow points on body of the person in the image IMG, and calculate the displacement vectors of all of the optical flow points within 2 seconds (for example, 60 images from the image IMG to an image IMG'), and the displacement vectors within 2 seconds may, for example, form a optical flow trajectory shown in FIG. 7. The optical flow determination module 135 may calculate a sum of the displacement vectors of all of the optical flow points within the 2 seconds to serve as the optical flow vector. In detail, the optical flow determination module 135 may, for example, take a position of the each of the optical flow points in the image IMG as a start point, and take a position of the optical flow point in the image IMG' after 2 seconds as an end point to calculate the optical flow vector of each of the optical flow points. It should be noted that a time length of the predetermined time is not limited by the invention, which may be set by those skilled in the art according to an actual requirement.

In step S145, the optical flow determination module 135 calculates the number the optical flow points moving toward each of the directions according to the optical flow vectors of the optical flow points to serve as the movement trends in each of the directions. To be specific, the optical flow determination module 135 first defines a plurality of directions, and then calculates the number the optical flow points moving toward each of the directions according to the optical flow vectors of each of the optical flow points to serve as the movement trends in each of the directions.

Figure 8:
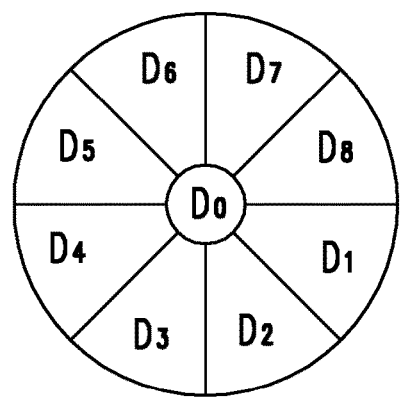
FIG. 8 is a schematic diagram of a plurality of directions according to an embodiment of the invention.
Figure 9:
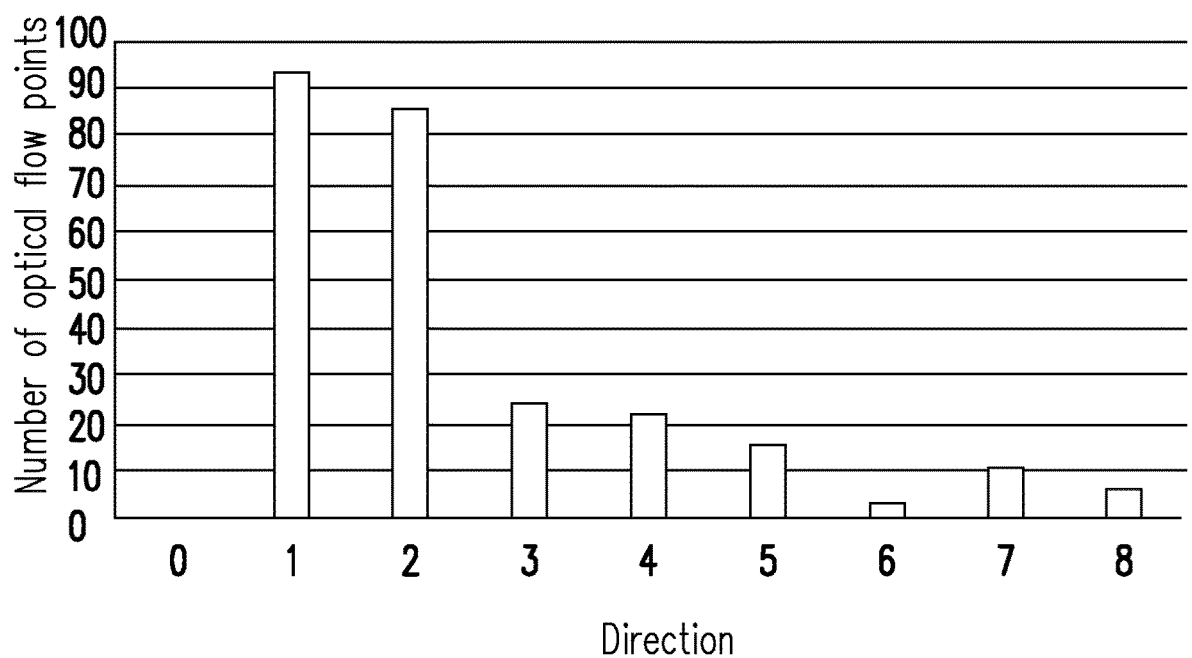
FIG. 9 is a schematic diagram of movement trends of a plurality of directions according to an embodiment of the invention.

In an embodiment of the invention, as shown in FIG. 8, the processor 121 may define nine directions D0 to D8. In detail, the direction D0 represents zero vector, and D1 to D8 are used for defining 8 different direction ranges. For example, when a point direction of a certain specific vector falls within the direction range of D1, the certain specific vector is regarded to point the direction D1; when a point direction of a certain specific vector falls within the direction range of D2, the certain specific vector is regarded to point the direction D2; when a point direction of a certain specific vector falls within the direction range of D3, the certain specific vector is regarded to point the direction D3, and the others are deduced by analogy. Then, as shown by the movement trends in FIG. 9, the optical flow determination module 135, for example, calculates moving directions of the defined optical flow points within 2 seconds to serve as a plurality of the movement trends of the person in multiple directions. For example, the number of the optical flow points moving toward the direction D1 is about 92, the number of the optical flow points moving toward the direction D2 is about 85, and the number of the optical flow points moving toward the direction D5 is about 15, which represents that the movement trend of the person toward the direction D1 is greater than the movement trends of the person toward the directions D2 and D5, and the movement trend of the person toward the direction D2 is greater than the movement trend of the person toward the direction D5, and the others are deduced by analogy.

In step S150, the processor 121 inputs the falling related features obtained by the object tracking module 133 and the movement trends of the person in multiple directions determined by the optical flow determination module 135 to the falling classifier 137, such that the falling classifier 137 generates an output result indicating whether a falling event happens to the person. To be specific, when the conventional method only uses the 2D video stream to determine whether the person in the image falls, the determination performed only according to some specific variables may probably cause an error. For example, when the person in the video stream moves towards a direction of the image capturing device, the body parts moving downward are relatively more, though the person does not fall. Therefore, by using the machine learning method to input a plurality of different parameters associated with the falling motion to the falling classifier, a more accurate output result is obtained.

In an embodiment of the invention, the processor 121, for example, trains the falling classifier 137 in advance, for example, to first create a plurality of training images with falling marks of a "falling" event or a "not falling" event, etc., and input the training images with the falling marks to the falling classifier for training, though the invention is not limited thereto.

Therefore, after the processor 121 inputs the falling related features obtained by the object tracking module 133 and the movement trends of the person in multiple directions determined by the optical flow determination module 135 to the falling classifier 137 in the step S150, the falling classifier 137 may, for example, use a K-Nearest Neighbors (KNN) algorithm to classify the input information to one of two event categories of "falling" and "not falling", and take the classification result as an output result for outputting. However, the invention is not limited thereto.

For example, a plurality of sample vectors are input to train the falling classifier 137, where each of the sample vectors includes a plurality of falling related features and a plurality of movement trends serving as components, and corresponds to one event, i.e. the "falling" event or the "not falling" event. Therefore, the trained falling classifier 137 may record a plurality of sample vectors and the categories thereof. When the processor 121 inputs the falling related features obtained from the object tracking module 133 and the movement trends obtained from the optical flow determination module 135 to the trained falling classifier 137, the falling classifier 137 may calculate feature vectors corresponding to the input falling related features and the movement trends, and calculate an included angle (or referred to as Cosine Similarity) between the feature vector and each of the sample vectors according to a following equation:

$$S = \cos(\theta) = \frac{\vec{A} \cdot \vec{B}}{\|\vec{A}\|\|\vec{B}\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

Where S represents an included angle or cosine similarity of two vectors of $\vec{A}$ and $\vec{B}$, $A_i$ represents a plurality of components of $\vec{A}$, and $B_i$ represents a plurality of components of $\vec{B}$, n is a dimension of the vector. Thereafter, the falling classifier 137 may find K sample vectors having the highest cosine similarity with the feature vector, and determine which event is more involved in these K sample vectors, so as to determine the category of the feature vector. For example, when K is 51, in the 51 sample vectors having the highest cosine similarity with the feature vector, if 40 sample vectors belong to the "falling" event, and 11 sample vectors belong to the "not falling" event, the falling classifier 137 may classify the feature vector as the "falling" event and output the output result of the "falling" event. It should be noted that the value of K may be set by those skilled in the art according to an actual requirement, which is not limited by the invention.

In an embodiment of the invention, besides the two events of "falling" and "not falling", the falling classifier 137 may also be trained to have more events. For example, the falling classifier 137 may be trained to have three events of "standing" "walking" and "falling", though the invention is not limited thereto.

A following table one schematically lists several falling related features and movement trend diagrams input to the falling classifier 137 and the corresponding output results thereof. As shown in FIG. 1, the falling related features inputted to the falling classifier 137 by the processor 121, for example, include a vertical axis movement amount F1 of the center of mass CM, the minimum distance F2 between the ground and the human body features above the shoulder (for example, the minimum one of the distances respectively between the ground and the eyes, the nose, the ears, the neck and the shoulder), the length-width ratio F3 (L/W) of the bounding box BDR, a height F4 of the center of mass CM and a human body azimuth F5 (θ), and the plurality of movement trends are, for example, in the movement trend diagram D_trend of FIG. 9.

TABLE 1

| | Falling related features and movement trends | | | | | |
|---|---|---|---|---|---|---|
| Category | F1 | F2 | F3 | F4 | F5 | D trend |
| Standing (not falling) | 2 pixels/ second | 200 pixels | 4.5 | 100 pixels | 90° | Movement trend diagram with the highest movement trend of the direction D0 |
| Walking (not falling) | 3 pixels/ second | 205 pixels | 4.55 | 105 pixels | 85° | Movement trend diagram with the highest movement trend of the direction D8 |
| Falling | 100 pixels/ second | 10 pixels | 0.22 | 10 pixels | 0° | Movement trend diagram with the highest movement trend of the direction D2 |

For example, when the vertical axis movement amount F1 of the center of mass CM inputted to the falling classifier 137 by the processor 121 is 2 pixels/second, the minimum distance F2 between the ground and the human body features above the shoulder is 200 pixels, the length-width ratio F3 of the bounding box BDR is 4.5, the height F4 of the center of mass CM is 100 pixels, the human body azimuth F5 is 90°, and the plurality of movement trends inputted to the falling classifier 137 are based on the movement trend diagram with the highest movement trend of the direction D2, the falling classifier 137 may output the output result of the "standing" event or the "not falling" event.

In step S160, the processor 121 determines whether the falling event happens to the person in the video stream according to the output result of the falling classifier 137. If yes, a step S170 is executed. Conversely, the flow returns to the step S110 to continuously monitor whether the falling event happens to a person in the video stream. For example, when the output result of the falling classifier 137 is the "standing" event, the "walking" event or the "not falling" event, it represents that the falling event does not happen to the person in the video stream, and the flow returns to the step S110. On the other hand, when the output result of the falling classifier 137 is the "falling" event, it represents that the falling event happens to the person in the video stream, and the flow enters the step S170.

In the step S170, the processor 121 sends an alarm through the warning device 123 according to the output result of the falling classifier 137. To be specific, the processor 121 may send the alarm through the warning device 123 when the output result is the "falling" event.

In an embodiment of the invention, the warning device 123, for example, sends a sound through a loudspeaker to serve as the alarm. In another embodiment of the invention, the warning device 123, for example, sends the alarm in figures or characters through a display. In other embodiment of the invention, the warning device 123, for example, sends the alarm through vibration or light.

Figure 10:
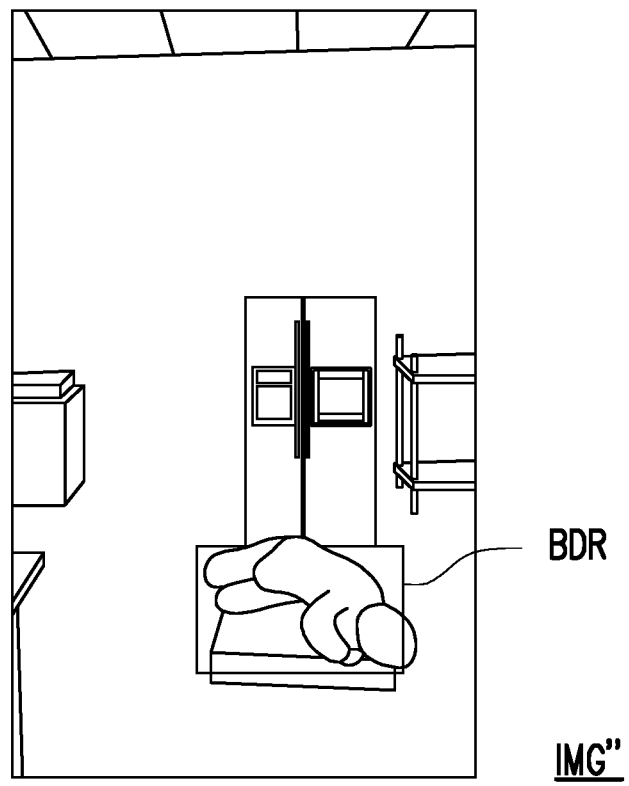
FIG. 10 is a schematic diagram of an image with a falling person in a video stream according to an embodiment of the invention.

In an embodiment of the invention, as shown in FIG. 10, besides sending the aforementioned alarm, the processor 121, for example, further sends a current image IMG" in the video stream to an electronic device held by a specific user (for example, a family member of the person in the video stream or medical staff) through an E-mail or a mobile phone message, etc. when the falling classifier 137 outputs the output result of the "falling" event, such that the specific user may inspect an actual falling situation to carry out necessary assistance or treatment.

It should be noted that in some embodiments, the electronic system 100 further includes a receiving device (not shown) coupled to the processor 121. The receiving device may, for example, receive a feedback signal corresponding to the output result. For example, after the falling classifier 137 outputs the output result, the user may, for example, send the feedback signal to the receiving device to notify the processor 121 whether the output result of the falling classifier 137 is correct. In this way, the processor 121 may again train the falling classifier 137 based on the video stream, the output result and the feedback signal of the user. In this way, determination accuracy of the electronic system 100 on people falling is enhanced along with increase of a usage time.

In summary, the falling detection method and the electronic system provided by the embodiment of the invention are adapted to use an image analysis method to determine whether a falling event happens to a person in the video stream, which has high convenience, and has a low cost. Particularly, by using a machine learning method, a plurality of falling related features and statistic information of optical flow vectors in the video stream are taken as the input of the falling classifier, so as to improve determination accuracy.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A falling detection method, comprising:
    obtaining a video stream;
    performing recognition on a person in at least one image of the video stream to obtain at least one human body feature;
    calculating based on the human body feature to obtain at least one falling related feature;
    calculating at least one movement trend of the person in a plurality of directions in the video stream by using an optical flow algorithm;
    inputting the at least one falling related feature and the at least one movement trend to a falling classifier, such that the falling classifier to generate an output result indicating whether a falling event happens to the person; and
    sending an alarm according to the output result,
    wherein the step of calculating the at least one movement trend of the person in the directions in the video stream by using the optical flow algorithm comprises:
    defining a plurality of optical flow points of the person;
    calculating a plurality of optical flow vectors of the optical flow points within a predetermined time based on the video stream; and counting the number of the optical flow points moving toward each of the directions according to the optical flow vectors of the optical flow points to serve as the at least one movement trend in each of the directions.

2. The falling detection method as claimed in claim 1, wherein the step of performing recognition on the person in the at least one image of the video stream to obtain the at least one human body feature further comprises:
recognizing whether the person exists in the at least one image of the video stream; and
performing recognition on the at least one human body feature in response to a recognition result of existence of the person.

3. The falling detection method as claimed in claim 1, wherein the at least one human body feature comprises a bounding box of the person, wherein the at least one falling related feature comprises one of a length-width ratio of the bounding box of the person, a main axis and a short axis, a human body azimuth, a height of a center of mass, a speed of the center of mass and a vertical axis displacement of the center of mass, or a combination thereof.

4. The falling detection method as claimed in claim 1, further comprising:
performing a skeleton detection on the person in the vide stream to detect a position of the at least one human body feature, wherein the at least one human body feature comprises one of eyes, a nose, ears, a neck, a shoulder, elbows, wrists, a hip portion, knees and ankles, or a combination thereof.

5. The falling detection method as claimed in claim 4, wherein the at least one falling related feature comprises distances respectively between the ground and at least one of the eyes, the nose, the ears, the neck and the shoulder.

6. The falling detection method as claimed in claim 1, further comprising:
creating a plurality of training images including a falling mark; and
using the training images to train the falling classifier.

7. The falling detection method as claimed in claim 6, further comprising:
receiving a feedback signal corresponding to the output result; and
training the falling classifier based on the video stream, the output result and the feedback signal.

8. The falling detection method as claimed in claim 1, further comprising:
tracking the person in the video stream by using a feature tracking method.

9. The falling detection method as claimed in claim 1, wherein the step of sending the alarm according to the output result comprises:
sending the alarm to an appointed electronic device according to the output result.

10. The falling detection method as claimed in claim 1, wherein the alarm comprises one of a text message, a video message, a voice message, a vibration message and a light message, or a combination thereof.

11. An electronic system, comprising:
an image capturing device, configured to obtain a video stream;
a processor, coupled to the image capturing device, and configured to:
perform recognition on a person in at least one image of the video stream to obtain at least one human body feature;
calculate based on the at least one human body feature to obtain at least one falling related feature;
calculate at least one movement trend of the person in a plurality of directions in the video stream by using an optical flow algorithm; and
input the at least one falling related feature and the at least one movement trend to a falling classifier, such that the falling classifier generates an output result indicating whether a falling event happens to the person; and
a warning device, coupled to the processor, and sending an alarm according to the output result,
wherein the step that the processor calculates the at least one movement trend of the person in the directions in the video stream by using the optical flow algorithm comprises:
defining a plurality of optical flow points of the person;
calculating a plurality of optical flow vectors of the defining a plurality of optical flow points of the person within a predetermined time based on the video stream; and
counting the number of the optical flow points moving toward each of the directions according to the optical flow vectors of the optical flow points to serve as the at least one movement trend of each of the directions.

12. The electronic system as claimed in claim 11, wherein the at least one human body feature comprises a bounding box of the person, wherein the at least one falling related feature comprises one of a length-width ratio of the bounding box of the person, a main axis and a short axis, a human body azimuth, a height of a center of mass, a speed of the center of mass and a vertical axis displacement of the center of mass, or a combination thereof.

13. The electronic system as claimed in claim 11, wherein the processor is further configured to:
perform a skeleton detection on the person in the vide stream to detect a position of the at least one human body feature, wherein the at least one human body feature comprises one of eyes, a nose, ears, a neck, a shoulder, elbows, wrists, a hip portion, knees and ankles, or a combination thereof.

14. The electronic system as claimed in claim 13, wherein the at least one falling related feature comprises distances respectively between the ground and the eyes, the nose, the ears, the neck and the shoulder.

15. The electronic system as claimed in claim 11, wherein the step that the warning device sends the alarm according to the output result comprises:
sending the alarm to an appointed electronic device according to the output result.

16. The electronic system as claimed in claim 15, wherein the alarm comprises one of a text message, a video message, a voice message, a vibration message and a light message, or a combination thereof.

17. An electronic system, comprising:
an image capturing device, configured to obtain a video stream;
an object tracking module, configured to perform recognition on a person in at least one image of the video stream to obtain at least one human body feature, and calculate based on the at least one human body feature to obtain at least one falling related feature;
an optical flow determination module, configured to calculate at least one movement trend of the person in a plurality of directions in the video stream; and
a falling classifier, receiving the at least one falling related feature and the at least one movement trend, and outputting an output result indicating whether a falling event happens to the person, wherein the step that the optical flow determination module calculates the at least one movement trend of the person in the directions in the video stream comprises:

defining a plurality of optical flow points of the person;

calculating a plurality of optical flow vectors of the optical flow points within a predetermined time based on the video stream; and counting the number of the optical flow points moving toward each of the directions according to the optical flow vectors of the optical flow points to serve as the at least one movement trend of each of the directions.

18. The electronic system as claimed in claim 17, further comprising:

a person recognition module, configured to recognize whether the person exists in the at least one image of the video stream, and perform recognition on the at least one human body feature in response to a recognition result of existence of the person.

* * * * *